June 21, 1927.
W. HINTON
1,633,328
MOLD FOR PLASTIC MATERIALS
Filed Aug. 17, 1926
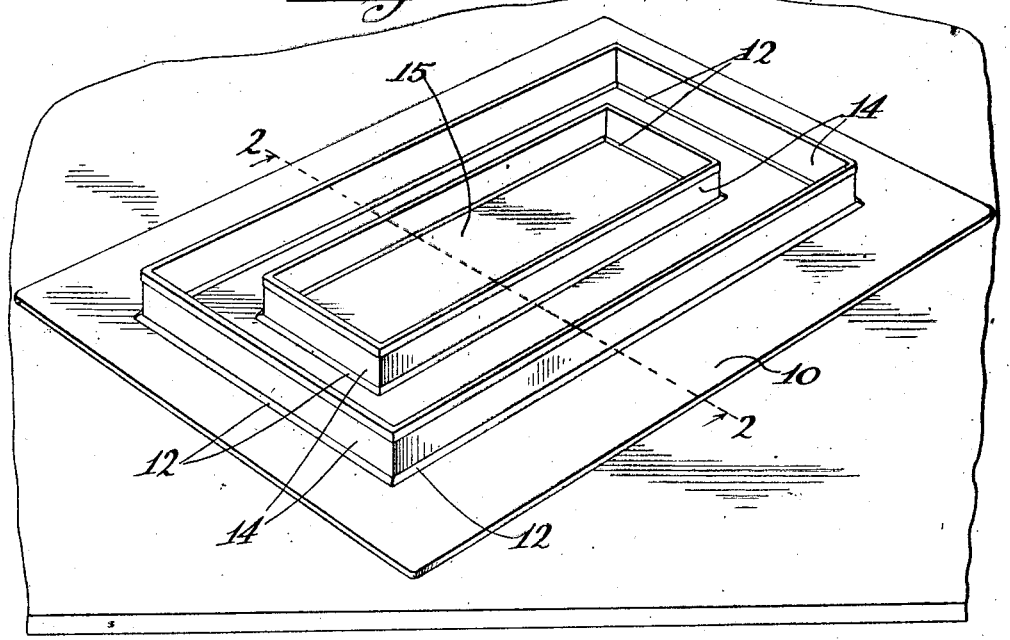
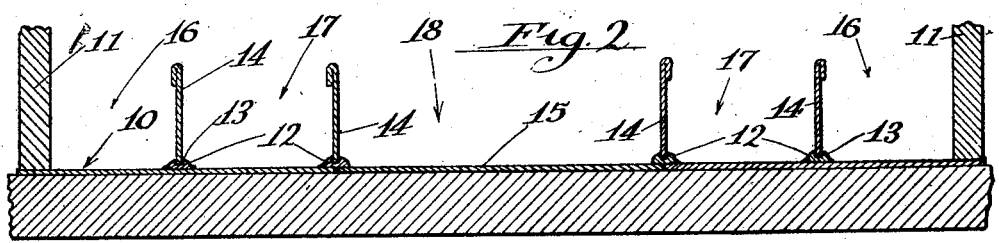
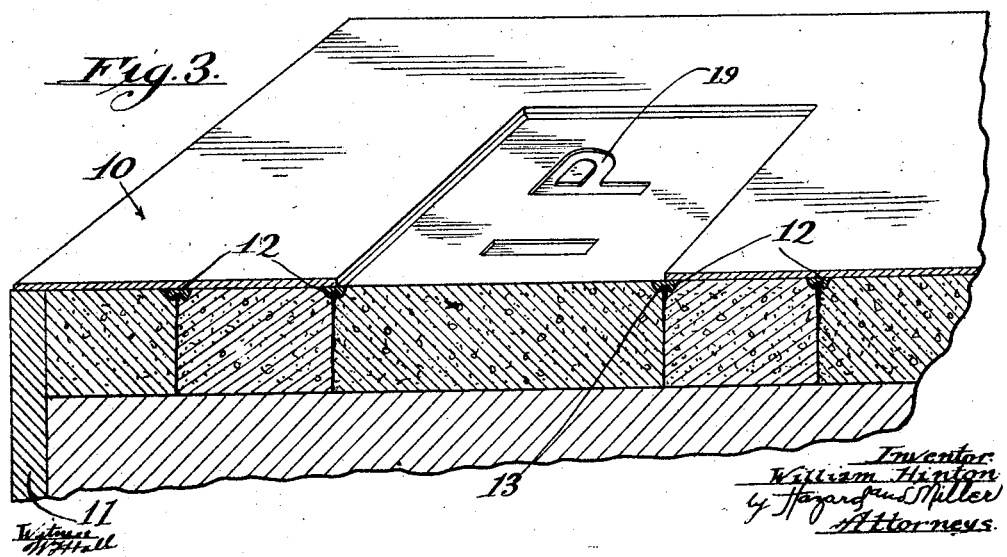

Patented June 21, 1927.

1,633,328

UNITED STATES PATENT OFFICE.

WILLIAM HINTON, OF SAN BERNARDINO, CALIFORNIA.

MOLD FOR PLASTIC MATERIALS.

Application filed August 17, 1926. Serial No. 129,719.

This invention relates to improvements in molds for plastic material.

An object of this invention is to provide a mold of novel construction designed for forming blocks or any other construction of a self-hardening plastic material, the plastic material being of several different kinds or of different colors, so that a type of mosaic construction which is completely formed of self-hardening plastic materials can be made.

Another object of this invention is to provide a mold consisting essentially of a supporting pallet having side walls and having partitions adapted to be positioned on the supporting pallet to divide the space between the side walls into various compartments into which different self-hardening plastic materials may be placed, and to provide a novel construction wherein there is a joint between the pallet and the partitions which will prevent the escape of one plastic material from one compartment into another, which might cause undesirable mixing.

A further object of this invention is to provide a mold having a supporting pallet about which side walls are arranged and which has its interior divided into compartments, and to provide the supporting pallet with a removable portion, the purpose of which is hereinafter to be described.

With the foregoing and other objects in view which will be made manifest in the following detailed description and specifically pointed out in the appended claims, reference is had to the accompanying drawings for an illustrative embodiment of the invention, wherein:

Figure 1 is a perspective view of the supporting pallet with the partitions applied thereto, Fig. 2 is a vertical section taken substantially on the line 2—2 of Fig. 1 and illustrating the side walls of the mold as applied to the pallet, and Fig. 3 is a perspective sectional view showing the mold in inverted position after the plastic materials have been placed therein and illustrating the utility of having a portion of the pallet removable.

Referring to the accompanying drawings wherein similar reference characters designate similar parts throughout, the improved mold consists of a supporting pallet 10 which may be of any desired shape and which is illustrated as being rectangular in form. Sides 11 are provided for the pallet, such sides being so arranged as to conform with the edges of the supporting pallet and may be provided by the conventional flask or the like. On the pallet there are brazed, welded, soldered or otherwise secured half rounds or beads 12, these beads being illustrated as forming rectangles on the top surface of the pallet 10, although they may be caused to form any other design which may be desired. Centrally of the beads or ridges and on top thereof there are formed grooves 13 which preferably have a very slight taper from their tops downwardly. Partitions 14 are provided which are preferably formed of sheet metal and which correspond to the beads or ridges 12. These partitions are adapted to be positioned on the beads and have their lower edges fitting within the grooves 13. The center portion of the pallet, indicated at 15, is shown as being removable with its edge portions abutting the overhanging parts of the inside beads or half rounds 12.

In use the mold is assembled, as shown in Fig. 2, wherein the various partitions 14 serve to divide the space between the side walls 11 into compartments. Each compartment is adapted to receive a self-hardening plastic material, and the various self-hardening materials which are placed in the different compartments may be of different colors. For example, a blue material can be placed in the outer compartment 16, a white material can be placed in the intermediate compartment 17 and a red material can be placed in the central compartment 18. The partitions serve to keep these materials from mixing with one another, and as their lower edges fit within the grooves on the beads 12, a joint is thus provided which will prevent one color of material from leaking between the bottom edge of a partition and the supporting pallet from one compartment to another. After the material has been placed in the mold, the partitions are then removed, and concrete or its equivalent is placed in the mold on top of the plastic material placed in the various compartments. When the entire block has set, the face of the block will have various colors clearly defined from each other. The beads 12 form grooves on the face of the block defining one color from another, and, if desired, these grooves can be subsequently filled, forming a clear line of distinction between one color and another.

The improved mold has been primarily designed for forming headstones and it is desirable in such cases to print letters on the face of the block. To this end the center portion of the supporting pallet is removable, and can be removed as shown in Fig. 3 before the material has hardened, permitting trowelling of the surface of the material filling the central compartment 18. After the surface has been trowelled, letters 19 or designs can be formed upon this surface.

From the above described construction it will be appreciated that a novel mold is provided which will enable blocks to be formed from self-hardening plastic materials of different colors and which will effectively prevent the blurring of colors or mixing of them. Furthermore, the improved mold permits designs to be imprinted upon the face of the block provided thereby. It will be readily understood that the particular shape of the compartments, partitions and beads may be varied to cause the covering on the face of the block to assume different designs from that shown. Furthermore, the number of compartments can be readily increased or decreased, as desired, and the colors of the materials placed therein can also be varied.

It will be understood that various changes may be made in the detail of construction without departing from the spirit or scope of the invention as defined by the appended claims.

I claim:

1. A mold comprising a pallet, means providing side walls upon the pallet, there being beads or ridges upon the pallet and integral therewith, and partitions adapted to be positioned upon said beads to divide the space above the pallet into compartments into which various plastic materials may be placed.

2. A mold comprising a pallet, means providing side walls upon the pallet, there being beads or ridges upon the pallet and integral therewith and having grooves formed therein, and partitions adapted to be positioned upon said beads with their lower edges fitting in the grooves, said partitions serving to divide the space above the pallet into compartments in which various self-hardening plastic materials may be placed.

3. A mold comprising a pallet, means providing side walls upon the pallet, there being beads or ridges upon the pallet having grooves formed therein, and partitions adapted to be positioned upon said beads with their lower edges fitting in the grooves, said partitions serving to divide the space above the panel into compartments in which various self-hardening plastic materials may be placed, a portion of the panel which forms substantially the complete bottom for one of said compartments being removable from the remainder of the pallet for the purpose described, said portion having its edge portions adapted to abut against the beads defining the base of its compartment.

4. A mold comprising a pallet, means providing side walls upon the pallet, there being beads or ridges on the pallet on the upper side thereof in which grooves are formed, the sides of the grooves being rigidly connected to each other and partitions serving to divide the space above the pallet into compartments in which various self-hardening plastic materials may be placed, said partitions being adapted to be positioned upon said beads with their lower edges fitting in said grooves.

5. A mold comprising a pallet, means providing side walls for the pallet, there being beads or ridges provided on the upper surface of the pallet and projecting upwardly therefrom so as to define the bottoms of compartments on the pallet, said beads or ridges being integral with the pallet and in fixed relation to each other, partitions adapted to be positioned on said pallet and have their lower edges bearing against said beads or ridges, said partitions serving to divide the space above the pallet into compartments in which various self-hardening plastic materials may be placed.

In testimony whereof I have signed my name to this specification.

WM. HINTON.